June 12, 1951   J. A. FURTADO   2,556,266
FRUIT CUTTING AND PITTING APPARATUS
Filed Nov. 18, 1949   2 Sheets-Sheet 1
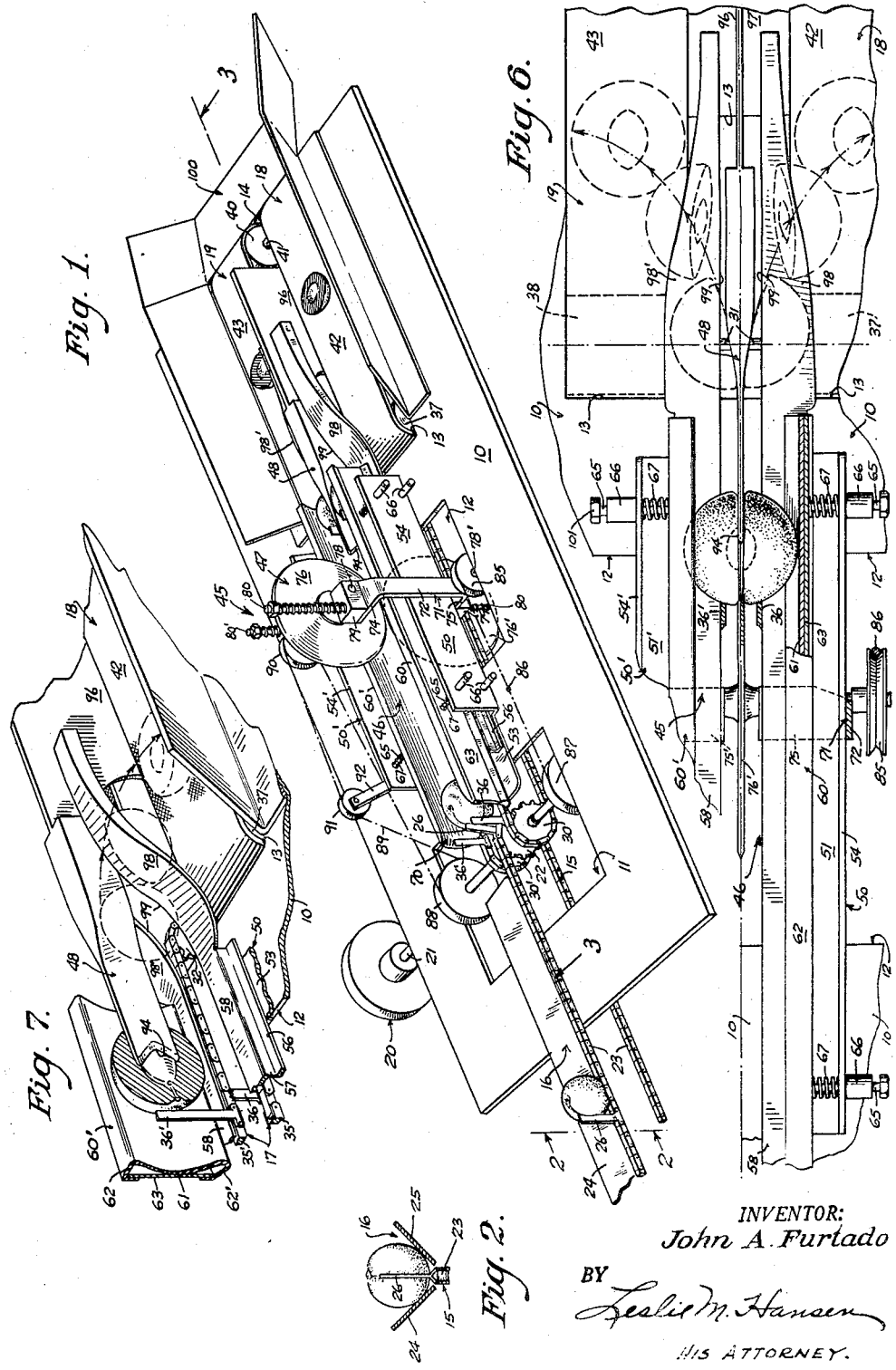
INVENTOR:
John A. Furtado
BY
Leslie M. Hansen
HIS ATTORNEY.

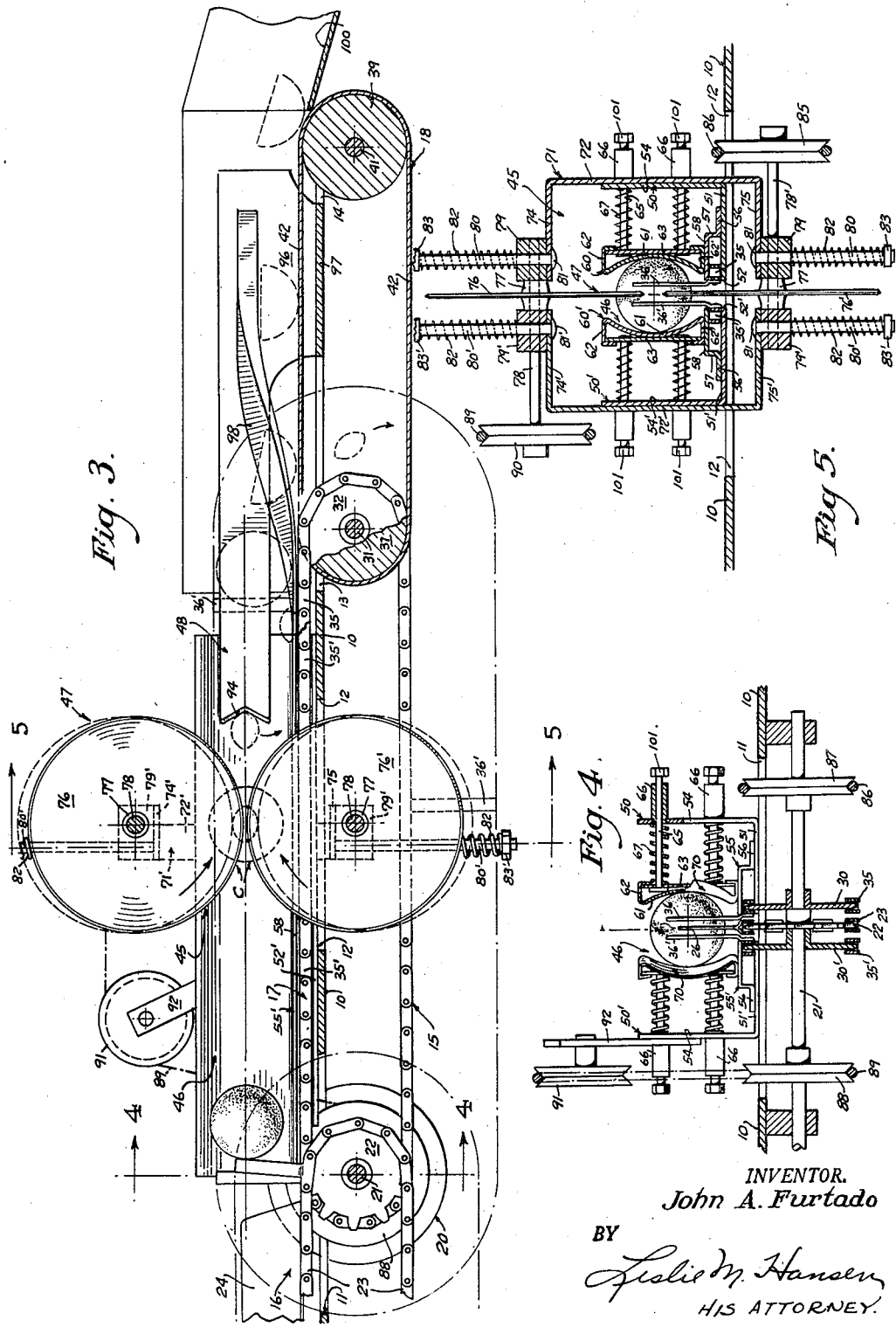

Patented June 12, 1951

2,556,266

UNITED STATES PATENT OFFICE 2,556,266

FRUIT CUTTING AND PITTING APPARATUS

John A. Furtado, Hollister, Calif.

Application November 18, 1949, Serial No. 128,173

13 Claims. (Cl. 146—28)

This invention relates to fruit handling apparatus and more particularly to improvements in apparatus for cutting and pitting fruit of the free stone variety such as peaches, apricots and the like.

One object of this invention is to provide a device which is simple in construction yet highly effective in halving and removing the pits from apricots and other fruit of like character.

Another object is to provide an automatically operated machine for holding the fruit in a proper or oriented position during halving thereof and for liberating the severed halves from the pit within them.

It is another object to provide a yielding gripping guide for fruit being advanced through the machine to thereby accommodate the machine to the handling of fruit of various sizes.

Still another object is to provide a novel fruit half separator and pit discharging feature incident to turning of the halved fruit for inspection of their pit cavities.

These and other objects of the present invention will become apparent from a reading of the following specification and claims in the light of the drawings in which:

Fig. 1 is a perspective view of an apparatus embodying the present invention.

Fig. 2 is a vertical section of the feed end of the apparatus shown in Fig. 1 and taken along line 2—2 thereof.

Fig. 3 is a longitudinal section of the device shown in Fig. 1 and taken substantially along line 3—3 thereof.

Fig. 4 is a vertical section at the transfer point between the feed and conveyor mechanisms of the apparatus and taken substantially along line 4—4 in Fig. 3.

Fig. 5 is a vertical section through the conveyor and fruit cutting mechanism as seen substantially along line 5—5 in Fig. 3.

Fig. 6 is a fragmentary plan view at the discharge end of the apparatus; and

Fig. 7 is an enlarged fragmentary perspective of a portion of the apparatus shown in Figs. 1 and 6 illustrating the manner of disposition of the fruit.

In Fig. 1 the apparatus is shown as having a base 10 adapted to be supported at counter height for enabling an attendant to watch and control the operation of the device. This base 10 is so formed as to provide several openings through which working parts of the mechanism can extend. It will be apparent that any form of construction may be employed and that the present disclosure embodies what I believe to be the most simple and therefore the preferred form of construction. The base 10 shown has an opening 12 at the center of the machine, and still another opening 13 adjacent the discharge end of the machine. In addition to these, the extreme end or discharge side of the base is provided with a recess 14 and all of the openings 11, 12 and 13 as well as the recess 14 are in alignment along the longitudinal axis of the machine.

A continuous conveyor system 15 runs congruent to the longitudinal axis of the machine and comprises a feed mechanism 16, a fruit advancing conveyor 17, and a pair of discharge conveyors 18 and 19. The entire conveyor system is operated from a single source of power, not shown, associated with a drive pulley 20. This pulley 20 is secured to a drive shaft 21 which is suitably journaled for rotation beneath the base 10 with the axis of shaft 21 extending transversely of the base 10 at the opening 11 adjacent the feed end of the machine. A sprocket 22 is secured to the drive shaft 21 in alignment with the longitudinal axis of the machine and with its periphery so disposed that a chain 23 of the feed mechanism extends over and under the foreward end of the base 10.

The chain 23 is also trained around a floating sprocket, not shown, so that the chain 23 is supported for movement in the plane of the longitudinal axis of the machine. Suitable side members 24 and 25 are supported on either side of the chain 23 preferably to form a V trough with the chain 23 at its bottom so as to support a fruit, such as an apricot, well above the chain. The chain 23 is also provided with a plurality of single flight arms 26 spaced from each other and adapted to extend upwardly into the V trough for pushing the fruit therein toward the fruit advancing conveyor 17. It will be noted that the fruit is disposed in the V trough with the suture line of the fruit on the longitudinal plane of the long axis of the machine. Moreover, as the fruit is advanced by the flight arm 26, the fruit will roll as deeply into the V trough as possible and hence the suture of the fruit will be maintained in the plane of movement of the fruit.

The fruit advancing conveyor 17 comprises a forward pair of sprockets 30—30' secured to the drive shaft 21 on either side of the sprocket 22 at the terminal of the feed mechanism 16. The opposite end of the fruit advancing conveyor 17 includes a shaft 31 suitably journaled below the base 10 transversely thereof at the opening 13 adjacent the discharge end of the machine. Another pair or aft set of sprockets 32, similar to the pair 30—30' previously mentioned, is secured to the shaft 31 in spaced relation so as to line up with the forward pair of sprockets. A chain 35—35' is trained around each respective set of sprockets of the forward and aft pairs thereof and the arrangement is such that the upper reaches of these chains 35—35' are slightly above the upper surface of the base 10 and in the same horizontal plane as the upper reach of the chain 23 of the feed mechanism, i. e., at the terminal of the latter.

A plurality of sets of twin pushers 36—36' are carried by the respective chains 35—35' in spaced relation along the same so as to pick up a fruit delivered to the fruit advancing conveyor from the feed mechanism and for advancing the fruit along toward the opposite end of the base 10.

The shaft 31 also has a set of pulleys associated therewith, there being one pulley 37 on one side of the pairs of sprockets 32 and another such pulley 38 on the other side of these sprockets 32. These pulleys 37 and 38 are secured to the shaft 31 for rotation therewith and form the powered end of the discharge conveyors 18 and 19 mentioned above. The opposite end of these discharge conveyors 18—19 include similar pulleys 39 and 40 mounted on a shaft 41 extending transversely of the open recess 14 at the extreme end of the base 10, the shaft 41 being suitably journaled for rotation below the base. A belt 42 trained around pulleys 37 and 39 and a similar belt 43 trained around the pulleys 38 and 39 serve to convey severed fruit halves to the discharge end of the base.

A fruit cutting and pit removing unit 45 of the machine is associated with the fruit advancing conveyor 17 and with part of the discharge conveyors 18 and 19 so as to completely sever and pit the fruit automatically during advancement of the fruit through the machine. This unit 45 includes a fruit gripping guide 46 which cooperates with the twin pushers 36—36' to maintain the fruit in alignment with the longitudinal axis of the machine. The unit 45 also includes a separatable fruit cutting device 47 and a pit abutting and fruit half separating blade 48, each of which is disposed in the longitudinal plane of the machine so as to operate upon the fruit conveyed therealong.

The fruit gripping guide 46 is supported on angle shaped side members 50 and 50' each of which includes a horizontal flange 51—51', respectively, extending parallel to the fruit advancing conveyor 17 with the free edges 52—52' of the respective flanges spaced from each other. These flanges support the upper reaches of the respective chains 35—35' just inside the edges 52—52' so that a substantial clearance is left between the chains and their upper reaches are maintained in a horizontal plane.

The major portions 53 of the flanges 51—51' along the edges 52—52' thereof span the center opening 12 in the base so as to support the chains 35—35' substantially the full distance of their run, the balance of the flanges 51—51' extending outwardly from the main portion 53 and having upstanding flanges 54—54' respectively, as is best seen in Figs. 1, 4 and 5. Associated with the flanges 51—51' are chain guards 55 and 55', each of which is of a substantial Z shape, one flange 56 of which is secured as by welding or the like to the major portion 53 of the particular flange 51—51' with which it is associated. The web 57 of each Z-shaped guard is dimensioned so as to dispose the other flange 58 thereof slightly above the chain which it guards, this uppermost flange 58 also forming an auxiliary table upon which the two halves of the fruit gripping guide 46 can ride.

The gripping guide 46 comprises two halves 60 and 60', each of which includes an arcuate plate 61 having upper and lower edges 62—62', respectively, bent back in parallelism. A back plate 63 is set against the convex face of each plate 61 and the ends of the upper and lower edges 62—62' are bent over the back plate 63 to hold it tightly against the convex face of the respective plate 61. These back plates 63 rigidify the respective arcuate plates 61 and become an integral part of the same for reasons now to be made apparent.

Guide pins 65 extend from the back plates 63 and into and through guide sleeves 66 secured to the respective upstanding flanges 54—54'. A compression spring 67 is mounted on each pin 66 between the plate 63 and the related upstanding flange 54 or 54' of the adjacent angle shaped side members 50 and 50' respectively. Each set of guide pins and sleeves 65—66 is arranged in pairs in which there is one set above the other at each end of the gripping guide halves, see Figs. 1 and 6. The arrangement is such that each pair of pins and sleeves hold the respective guide 60 or 60' in vertical position despite lateral movement of the same.

Each pin 65 fits rather loosely within its respective sleeve 66 so as to permit the entire guide 60 or 60' to be shifted into angular disposition, i. e., out of parallelism with respect to the longitudinal axis of the machine. However, each one of the guides 60 and 60' has its lower edge 62 supported for sliding movement on the aforementioned auxiliary table formed by the uppermost flange 58 of the Z-shaped chain guard 55 or 55' as the case may be, see Figs. 4 and 5. In this manner the halves 60—60' of the gripping guide are maintained at the desired vertical disposition above the fruit advancing conveyor 17.

The two gripping guide plates 60 and 60' are therefore so disposed as to yield relative to each other dependent upon the size of the fruit passed between them, it being noted that these two plates maintain the fruit in accurate alignment with the longitudinal axis of the machine and with the center of the fruit uniformly disposed along the axial center of the fruit gripping guide 46. The entrance end 70 of the gripping guide plates 60—60' are each flared outwardly a substantial distance so that, irrespective of the size of fruit presented thereto by the feed mechanism 16, the two plates will readily receive such fruit and immediately yield to it while maintaining it is alignment with the axial center of the fruit gripping guide.

The separatable fruit cutting device 47 is disposed in the vertical plane of the opening 12 at the center of the machine and is supported on U brackets 71—71', respectively. The U bracket 71 has its bight secured to the upstanding flange 54 of side member 50 and the U bracket 71' has its bight 72' secured to the upstanding flange 54' of side member 50' so that the upper legs 74—74' and lower legs 75—75' of the respective U brackets extend toward each other, see Fig. 5, but allow sufficient space between them to accommodate discs 76 and 76' which form a part of the fruit cutting device 47.

The upper disc 76 is journaled for rotation on the upper legs 74—74' of the U brackets and the lower disc 76' is journaled for rotation on the lower legs 75—75' of the same. The journal and drive for each disc is similar in construction in that the hub 77 of each disc 76 and 76' is secured to a shaft 78 and 78' respectively. Each shaft is rotatably supported in bearing blocks 79—79'. In the case of the upper disc 76, the block 79 is mounted on a rod 80 extending upwardly from the upper leg 74 of U bracket 71 and the block 79' is mounted on a rod 80' extending upwardly from the upper leg 74' of U bracket 71'. In the case of the lower disc 76' similar blocks 79—79' are mounted on similar rods 80—80' carried by legs 75—75', respectively.

The rods 80 and 80' have their headed ends 81 welded or otherwise secured to the respective legs from which they extend and the bearing blocks 79—79' are free to slide upon the respective rods. However, each rod carries a spring 82 which is pressed against the bearing block associated therewith by an adjusting nut 83—83' on the threaded end of the rod to set the springs at proper compression for holding the bearing blocks against the associated legs upon which they rest.

The bearing blocks 79 and 79' are normally held against the legs of the U brackets and the discs 76 and 76' are so dimensioned that the peripheries of the discs never touch each other but are disposed relatively close to the axial center of the gripping guides 60 and 60'. It should here be noted that the distance between the upper and lower legs 74—74' and 75—75', respectively, of the U brackets is such that they form a stop against which the bearings blocks bear to prevent them from passing beyond the limit of the diameters of the cutting discs.

Referring now to Fig. 3 it will be noted that the discs 76—76' travel in opposite directions with respect to each other and for this reason the shaft 78 for the disc 76 extends in one lateral direction while the shaft 78' for the disc 76' extends in the opposite direction. The lower disc and shaft 78' is driven by a pulley 85, a belt 86 and a pulley 87, the latter of which is secured to the main drive shaft 21 of the conveyor system 15. The upper disc and shaft 78 is also driven by the main drive shaft 21 but from a pulley 88 secured thereto and a belt 89 trained around pulley 88 and a pulley 90 secured to the extended end of the upper shaft 78. It will be noted, however, that the belt 89 is trained around an intermediate idler pulley 91 in a fashion to rotate the shaft 78 in an opposite direction relative to the direction of rotation of the lower shaft 78'. This intermediate pulley 91 is suitably journaled on a stub shaft carried at one end of an arm 92, the opposite end of which arm is secured to the upstanding flange 54' on that side of the machine.

From the foregoing it will be noted that the cutting discs rotate in the same direction as the movement of the fruit conveyor flights and consequently as the fruit is advanced between the discs, the meat of the fruit around the pit thereof is promptly cut, even though the two discs are caused to separate by reason of the passing of the pit between them. In other words, the relative proximity of the discs with respect to each other effects cutting of the fruit meat as a fruit enters the crevice C formed by the diverging peripheries of the discs. Moreover, since the discs rotate in directions compatible to the movement of the fruit by the twin pushers 36—36' on the advancing conveyor, it will be apparent that very little resistance to the cutting action of the discs will occur.

During passage of a fruit between the discs 76—76' the two ride the pit of the fruit and follow its contour in such a manner as to completely sever the fruit meat along the suture line of the fruit. In the meantime the severed halves of the fruit are always maintained in their previous relationship with respect to each other by the yieldable gripping guides between which the fruit is held and hence the fruit continues to be advanced in unison by the twin pushers 36—36'.

Just as the fruit halves clear the cutting discs the pit of such fruit engages an abutment which stops further forward movement of the pit although the two halves of the fruit continue moving forward under the influence of the twin pushers 36—36'. The abutment is provided by the pit abutting end 94 of the fruit half separating blade 48 hereinbefore referred to. This blade 48, as will be seen in Fig. 4, is disposed in a vertical plane coinciding with the longitudinal axis lying in the axial center of the fruit gripping guideways 60—60'. Part 96 of the main body of the blade extends downwardly in the region of the cross web 97 between opening 13 and the end recess 14 of the base 10 and is secured to this crossweb so as to support the blade in the position above explained.

As seen in Figs. 1, 6 and 7, the blade 48 has its side walls flared outwardly from the long axis of the blade whereby to deflect the fruit halves, moved along by the twin pushers, away from each other. Simultaneously with the foregoing separation of the fruit halves the same are caused to tilt outwardly by the downward pitch of skid plates 98—98' at either side of the blade 48. These skid plates extend from the aft ends of the auxiliary tables formed by the uppermost flanges 58 and the Z-shaped chain guards 55—55' hereinbefore mentioned. The skid plates 98—98' are curved upwardly to a substantially higher level than the auxiliary tables 58 and slant downwardly and away from their inner edges 99 as best illustrated in Fig. 3. It will be noted that the inner edges 99 of the skid plates continue in alignment with the inner edges 52—52' of the horizontal flanges 51—52' of the angle shaped side members 50—50' so that the twin flights 36—36' can pass between the skid plates and the flared side walls of the blade 48.

From the foregoing it will be apparent that the fruit halves are automatically turned outwardly and deposited upon the respective belts 42—43 with the pit cavity of each fruit half exposed for examination incident to discharge of the fruit halves into the chute 100 at the discharge end of the machine.

Attention is directed to Fig. 3 wherein it will be seen that the pits remaining at the abutting end 94 of the blade 48, as the fruit halves continue on, are caused to drop by gravity. The pits may lodge upon the inner edges of the chains 35—35' but upon being engaged by either of the twin pushers the pits will fall between the chains or be carried over the aft pair of sprockets 32 for discharge beneath the conveyors 18 and 19.

In summary it will be apparent that the fruit fed on to the feed mechanism 16 is oriented with its suture disposed in a vertical plane on the longitudinal axis of the machine. The oriented fruit is transferred to the fruit advancing conveyor 17 by which the fruit is moved forwardly in oriented condition. It should be noted that irrespective of differences in size of the fruit, the same, upon entering the mouth 70 of the fruit gripping guideway 46, is yieldingly held by the arcuate plates 61—61' thereof while being pushed by the twin pushers 36—36'. It should also be noted that the spring mounting of the guide halves 60—60' tends to keep them as close to the longitudinal axis of the machine as possible, it being understood, however, that the two guide halves are limited in movement toward each other by the nuts 101 on the ends of the guide pins 65 so that the guide halves are always supported on the auxiliary tables 58 of the chain guards. Consequently, although one fruit about to be discharged from the gripping guide 46 is still between the guide halves, while the next or successive fruit is entering the mouth 70 of the gripping guide, the two halves 60—60' thereof readily yield accordingly at opposite ends of the same. In other words, the two halves 60—60' of the guide 46 may become out of parallelism with respect to each other and yet properly hold the fruit therebetween with its suture oriented with the cutting plane of the discs 76—76'.

Immediately upon being released from the influence of the guide halves 60—60' the fruit halves are already divided by the thickness of the blade 48 and are promptly separated by the flared side walls of the latter. Simultaneously with the foregoing separation of the fruit halves the same are tilted outwardly and away from the blade 48 by the slight incline of the skid plates 98—98' adjacent their inner edges 99 while the twin pushers 36—36' continue to advance the fruit halves well onto the skid plates (see Fig. 6). The outward and downward slant of these skid plates cause the half spheres of fruit to topple over and onto the discharge conveyors with the pit cavity of each fruit half fully exposed for examination incident to discharge of the fruit halves from the machine.

While I have described the invention herein in specific detail it will be apparent to those skilled in the art that various modifications and alterations may be made without departure from the spirit of my invention. I therefore desire to avail myself of all variations, modifications and alterations as come within the scope of the following claims.

What I claim as new and desire to protect by Letters Patent is:

1. Apparatus for halving and pitting apricots and like fruit comprising a fruit advancing conveyor including twin pushers, means for feeding fruit onto said fruit advancing conveyor with the suture line of said apricots disposed in a vertical plane between said twin pushers, a fruit gripping guideway associated with said fruit advancing conveyor for yieldingly engaging fruit advanced thereby along their sides for maintaining said fruit with their suture line disposed in a predetermined vertical plane during advancement between said fruit gripping guideway, a pair of knives disposed in said predetermined vertical plane with their cutting edges facing each other and adapted to cut through the advancing fruit to the pit thereof, and a fruit half separating blade disposed in said predetermined vertical plane and having a pit abutting end disposed to stop forward movement of the pit of a cut fruit during continued movement of the corresponding severed halves thereof by said twin pushers.

2. Apparatus for halving and pitting apricots and like fruit comprising a fruit advancing conveyor including twin pushers, means for feeding fruit onto said fruit advancing conveyor with the suture line of said apricots disposed in a vertical plane between said twin pushers, a fruit gripping guideway associated with said fruit advancing conveyor for yieldingly engaging fruit advanced thereby along their sides for maintaining said fruit with their suture line disposed in a predetermined vertical plane during advancement between said fruit gripping guideway, a pair of knives disposed in said predetermined vertical plane with their cutting edges facing each other and adapted to cut through the advancing fruit to the pit thereof, a fruit half separating blade disposed in said predetermined vertical plane and having a pit abutting end disposed to stop forward movement of the pit of a cut fruit during continued movement of the corresponding severed halves thereof by said twin pushers, and means for engaging the severed halves of the fruit below during continued movement thereof beyond their stopped pit for tipping said severed halves from their tops outwardly so as to expose their pit cavities to view.

3. Apparatus for halving and pitting apricots and like fruit comprising a fruit advancing conveyor including twin pushers, means for feeding apricots onto said fruit advancing conveyor with the suture line of said apricots disposed in a vertical plane between said twin pushers, a fruit gripping guideway associated with said fruit advancing conveyor for yieldingly engaging fruit advanced thereby along their sides for maintaining said fruit with their suture line disposed in a predetermined vertical plane during advancement between said fruit gripping guideways, a pair of knives disposed in said predetermined vertical plane with their cutting edges facing each other and adapted to cut through the advancing fruit to the pit thereof, a fruit half separating blade disposed in said predetermined vertical plane and having a pit abutting end disposed to stop forward movement of the pit of a cut fruit during continued movement of the corresponding severed halves thereof by said twin pushers, means for engaging the severed halves of the fruit from below during continued movement thereof beyond their stopped pit for tipping said severed halves from their tops outwardly so as to expose their pit cavities to view, and a discharge conveyor arranged at the respective side of said blade and fruit half tipping means for receiving the fruit halves therefrom.

4. In a fruit halving device including a pair of fruit cutting knives arranged with their cutting edges disposed to engage the pit of a fruit passing between them, the combination therewith of a fruit advancing conveyor having twin pushers that straddle the cutting knives for pushing the fruit on either side thereof, a fruit gripping guideway extending congruent to said fruit advancing means and including a pair of elongated guide plates having their inner faces disposed to engage a fruit being advanced by said twin pushers to maintain such fruit in a plane to be cut midway by said knives, spring loaded guide means at each end of said guide plates for rendering them yieldable so as to accommodate fruit of various diameters between them, and a fruit half separating blade disposed in the plane of the incision line of said fruit as effected by said cutting knives and having a pit abutting end disposed to engage the pit of a cut fruit as it passes from between said knives for stopping advancement of such pit during continued movement of the corresponding fruit halves beyond the same.

5. In a fruit halving device including a pair of fruit cutting knives arranged with their cutting edges disposed to engage the pit of a fruit passing between them, the combination therewith of a fruit advancing conveyor having twin pushers that straddle the cutting knives for pushing the fruit on either side thereof, a fruit gripping guideway extending congruent to said fruit advancing means and including a pair of elongated guide plates having their inner faces disposed to engage a fruit being advanced by said twin pushers to maintain such fruit in a plane to be cut midway by said knives, spring loaded guide means at each end of said guide plates for rendering them yieldable so as to accommodate fruit of various diameters between them, a fruit half separating blade disposed in the plane of the incision line of said fruit as effected by said cutting knives and having a pit abutting end disposed to engage the pit of a cut fruit as it passes from between said knives for stopping advancement of such pit during continued movement of the corresponding fruit halves beyond the same, and skid plates spaced from said blade at each side thereof for engaging the severed fruit halves after they have passed the pit abutting end of said blade for turning said fruit halves outwardly for exposing their pit cavities to full view.

6. In a fruit halving device including a pair of fruit cutting knives arranged with their cutting edges disposed to engage the pit of a fruit passing between them, the combination therewith of a fruit advancing conveyor having twin pushers that straddle the cutting knives for pushing the fruit on either side thereof, a fruit gripping guideway extending congruent to said fruit advancing means and including a pair of elongated guide plates having their inner faces disposed to engage a fruit being advanced by said twin pushers to maintain such fruit in a plane to be cut midway by said knives, spring loaded guide means at each end of said guide plates for rendering them yieldable so as to accommodate fruit of various diameters between them, a fruit half separating blade disposed in the plane of the incision line of said fruit as effected by said cutting knives and having a pit abutting end disposed to engage the pit of a cut fruit as it passes from between said knives for stopping advancement of such pit during continued movement of the corresponding fruit halves beyond the same, skid plates spaced from said blade at each side thereof for engaging the severed fruit halves after they have passed the pit abutting end of said blade for turning said fruit halves outwardly for exposing their pit cavities to full view, and a pair of discharge conveyors mounted to receive the outwardly turning fruit halves from said skid plates and for supporting said fruit halves with their pit cavities facing upward during movement of said fruit halves by said discharge conveyors.

7. In a fruit halving device including a pair of separatable fruit cutting knives arranged with their cutting edges disposed to engage the pit of a fruit passing therebetween, the combination therewith of a fruit advancing conveyor having twin pushers disposed to engage a fruit just outside and at both sides of the point of incision of said knives with the fruit, and a fruit gripping guideway associated with said fruit advancing means so as to cooperate with the latter for maintaining a fruit advanced thereby in a plane to be cut diametrically by said cutting knives, said gripping guideway comprising a pair of elongated arcuate guide plates having their inner concave faces opposite each other for holding a fruit therebetween in a plane to be severed by said knives, means for mounting said guide plates for movement toward and away from said knives, and spring means for urging said guide plates toward said knives to thereby yieldingly engage the fruit during advancement thereof by said twin pushers.

8. In a fruit halving device including a pair of separatable fruit cutting knives arranged with their cutting edges disposed to engage the pit of a fruit passing therebetween, the combination therewith of a fruit advancing conveyor having twin pushers disposed to engage a fruit just outside and at both sides of the point of incision of said knives with the fruit, and a fruit gripping guideway associated with said fruit advancing means so as to cooperate with the latter for maintaining a fruit advanced thereby in a plane to be cut diametrically by said cutting knives, said gripping guideway comprising a pair of elongated arcuate guide plates having their inner concave faces opposite each other for holding a fruit therebetween in a plane to be severed by said knives, means for mounting said guide plates for movement toward and away from said knives, spring means for urging said guide plates toward said knives to thereby yieldingly engage the fruit during advancement thereof by said twin pushers, and means for engaging the severed halves of the fruit for turning said halves outwardly to expose their pit cavities to full view.

9. In a fruit halving device including a pair of separatable fruit cutting knives arranged with their cutting edges disposed to engage the pit of a fruit passing therebetween, the combination therewith of a fruit advancing conveyor having twin pushers disposed to engage a fruit just outside and at both sides of the point of incision of said knives with the fruit, and a fruit gripping guideway associated with said fruit advancing means so as to cooperate with the latter for maintaining a fruit advanced thereby in a plane to be cut diametrically by said cutting knives, said gripping guideway comprising a pair of elongated arcuate guide plates having their inner concave faces opposite each other for holding a fruit therebetween in a plane to be severed by said knives, means for mounting said guide plates for movement toward and away from said knives, spring means for urging said guide plates toward said knives to thereby yieldingly engage the fruit during advancement thereof by said twin pushers, means for engaging the severed halves of the fruit for turning said halves outwardly to expose their pit cavities to full view, and a pair of discharge conveyors mounted on either side of said means for engaging and turning said severed halves of the fruit for receiving said fruit halves and supporting them with their pit cavities exposed to full view.

10. Apparatus for halving and pitting apricots comprising a fruit advancing conveyor, gripping guide means associated with said conveyor for holding the fruit advanced thereby in a predetermined plane, separatable cutting knives disposed in said predetermined plane with their cutting edges positioned opposite each other to engage the meat of a whole fruit advanced therebetween for cutting said meat to the pit of the fruit, and a fruit half separating blade disposed in said predetermined plane and having a pit abutting end adapted to engage and stop movement of the pit of a fruit during advancement of the severed halves of said fruit beyond the pit abutting end of said separating blade.

11. Apparatus for halving and pitting apricots comprising a fruit advancing conveyor, gripping guide means associated with said conveyor for holding the fruit advanced thereby in a predetermined plane, separatable cutting knives disposed in said predetermined plane with their cutting edges positioned opposite each other to engage the meat of a whole fruit advanced therebetween for cutting said meat to the pit of the fruit, a fruit half separating blade disposed in said predetermined plane and having a pit abutting end adapted to engage and stop movement of the pit of a fruit during advancement of the severed halves of said fruit beyond the pit abutting end of said separating blade, and means for engaging the severed halves of the fruit for turning said halves outwardly to expose their pit cavities to full view.

12. Apparatus for halving and pitting apricots comprising a fruit advancing conveyor, gripping guide means associated with said conveyor for holding the fruit advanced thereby in a predetermined plane, separatable cutting knives disposed in said predetermined plane with their cutting edges positioned opposite each other to engage the meat of a whole fruit advanced therebetween for cutting said meat to the pit of the fruit, a fruit half separating blade disposed in said predetermined plane and having a pit abutting end adapted to engage and stop movement of the pit of a fruit during advancement of the severed halves of said fruit beyond the pit abutting end of said separating blade, means for engaging the severed halves of the fruit for turning said halves outwardly to expose their pit cavities to full view, and a pair of discharge belts mounted on either side of said separating blade for receiving the fruit halves with their pit cavities exposed to full view.

13. A fruit gripping guideway adapted to be associated with a twin chain conveyor with their fruit advancing reaches spaced from each other to pass on either side of a cutting knife disposed in a predetermined plane, said fruit gripping guideway comprising means for supporting the fruit advancing reaches of said twin chains in a common plane, a chain guard overlying the fruit advancing reaches of said twin chains and forming an auxiliary table above the same, said supporting means having upstanding sidewalls disposed outside of the auxiliary tables, a pair of elongated plates arcuate in cross section and disposed with their concave faces facing each other to form a tube-like path for the fruit advanced therebetween, means at each end of said plates and carried by said upstanding sidewalls of said supporting means for supporting said plates for sliding movement toward and from each other upon said auxiliary tables, and spring means for maintaining said plates in yielding contact with a fruit advancing therebetween.

JOHN A. FURTADO.

REFERENCES CITED

The following references are of record in the file of this patent:

UNITED STATES PATENTS

| Number | Name | Date |
|---|---|---|
| 383,739 | Lillie | May 29, 1888 |
| 424,771 | Fleming et al. | Apr. 1, 1890 |
| 1,334,162 | Moltzner | Mar. 16, 1920 |
| 1,909,667 | Douthitt | May 16, 1933 |
| 1,915,447 | Robbins | June 27, 1933 |
| 1,918,830 | Bem | July 18, 1933 |
| 1,978,808 | Milam et al. | Oct. 30, 1934 |
| 2,010,865 | Kingsbury | Aug. 13, 1935 |
| 2,151,943 | Sievers | Mar. 28, 1939 |
| 2,185,090 | Millen | Dec. 26, 1939 |
| 2,187,326 | Nicoll et al. | Jan. 16, 1940 |
| 2,455,449 | Thames | Dec. 7, 1948 |
| 2,498,962 | Patterson | Feb. 28, 1950 |